April 26, 1949. B. BRASSELL 2,468,652
CONTROL INSTRUMENTALITY
Filed July 20, 1946 11 Sheets-Sheet 3
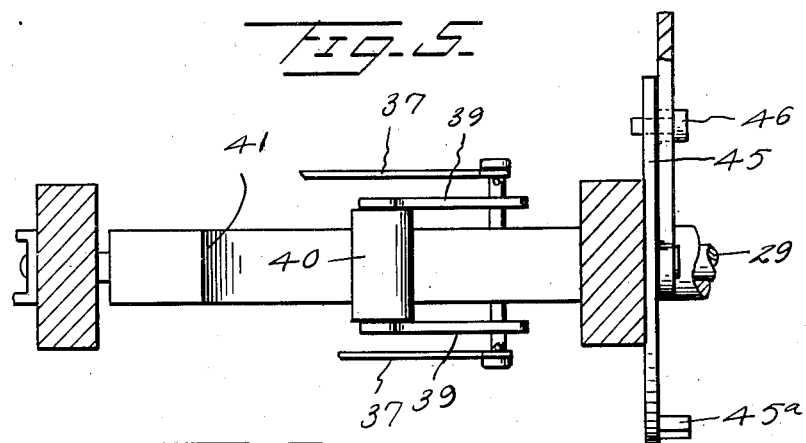
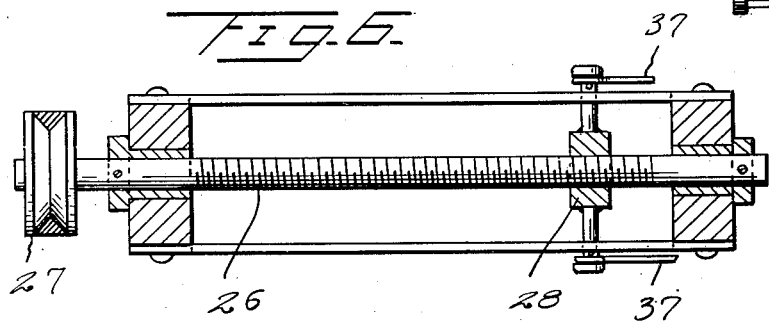
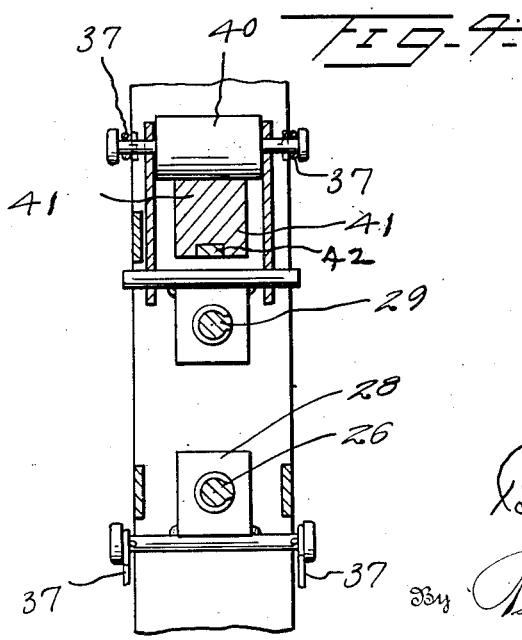

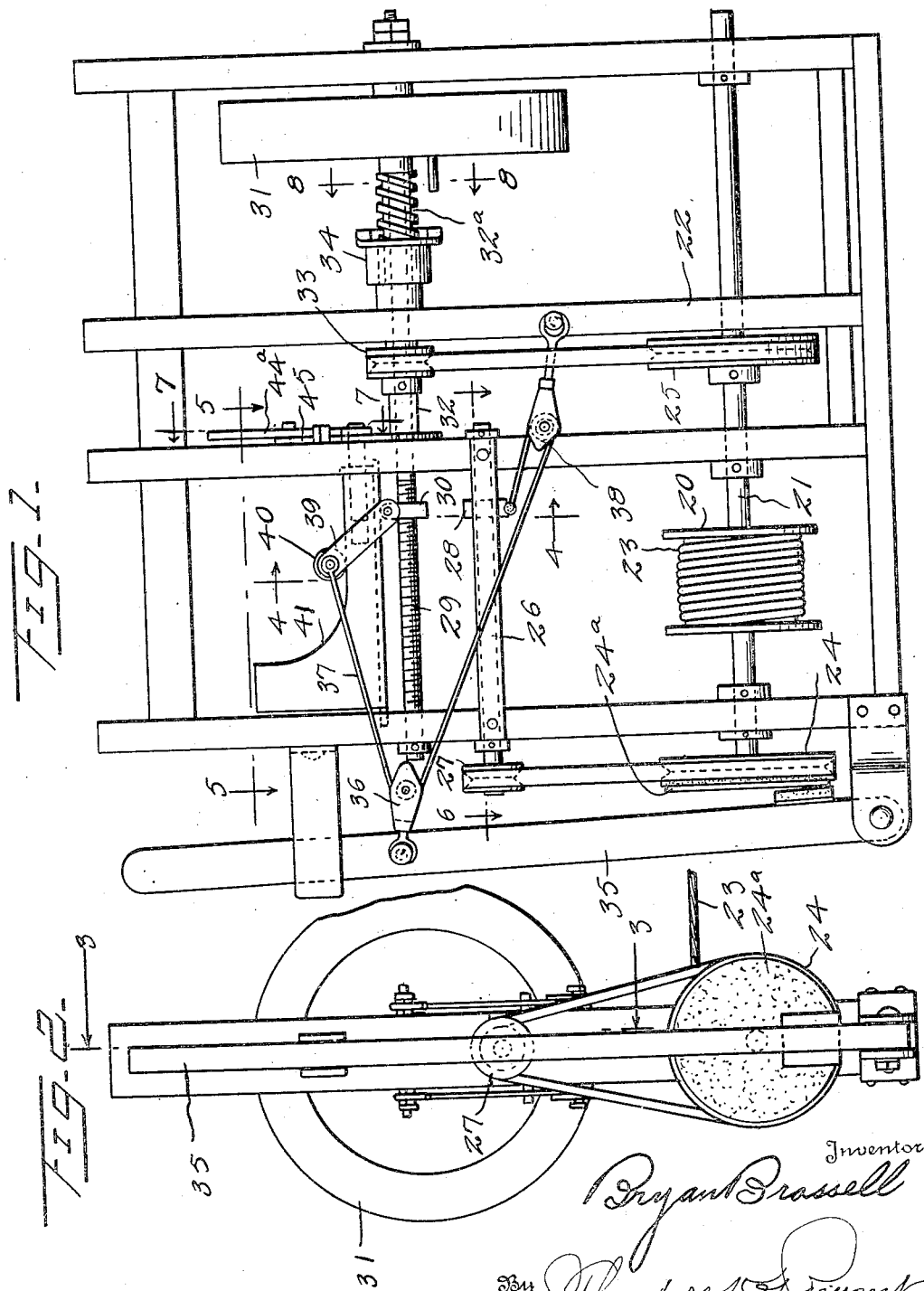

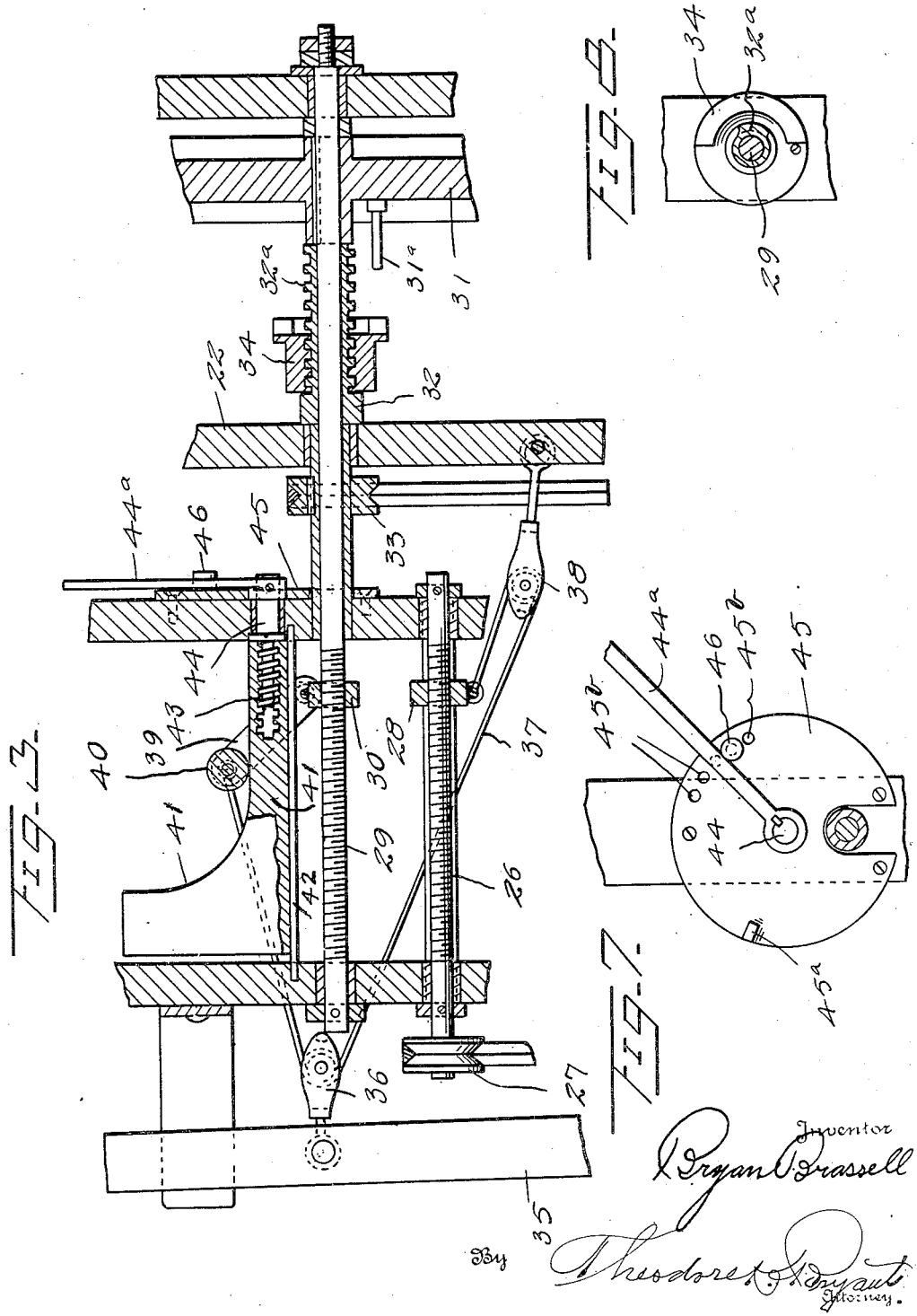

April 26, 1949.  B. BRASSELL  2,468,652
CONTROL INSTRUMENTALITY
Filed July 20, 1946  11 Sheets-Sheet 4
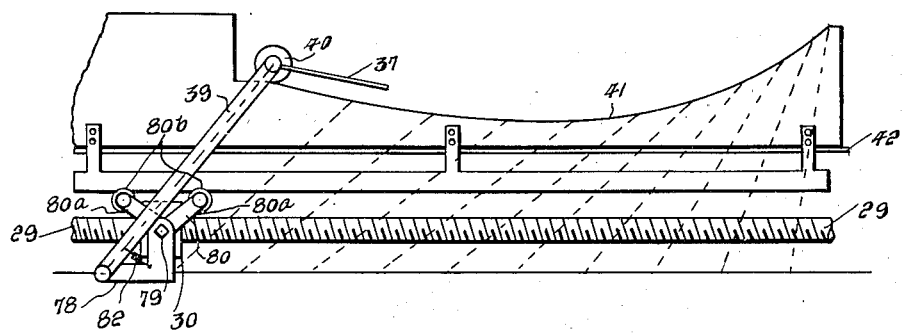
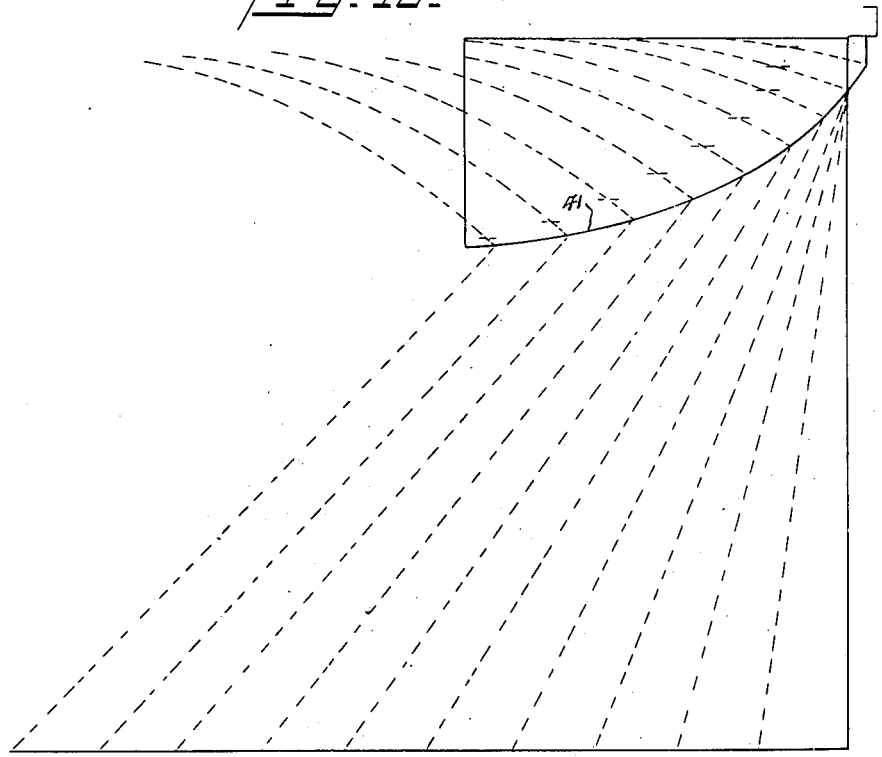

April 26, 1949.　　　　B. BRASSELL　　　　2,468,652
CONTROL INSTRUMENTALITY
Filed July 20, 1946　　　　　　　　　　　　11 Sheets-Sheet 5
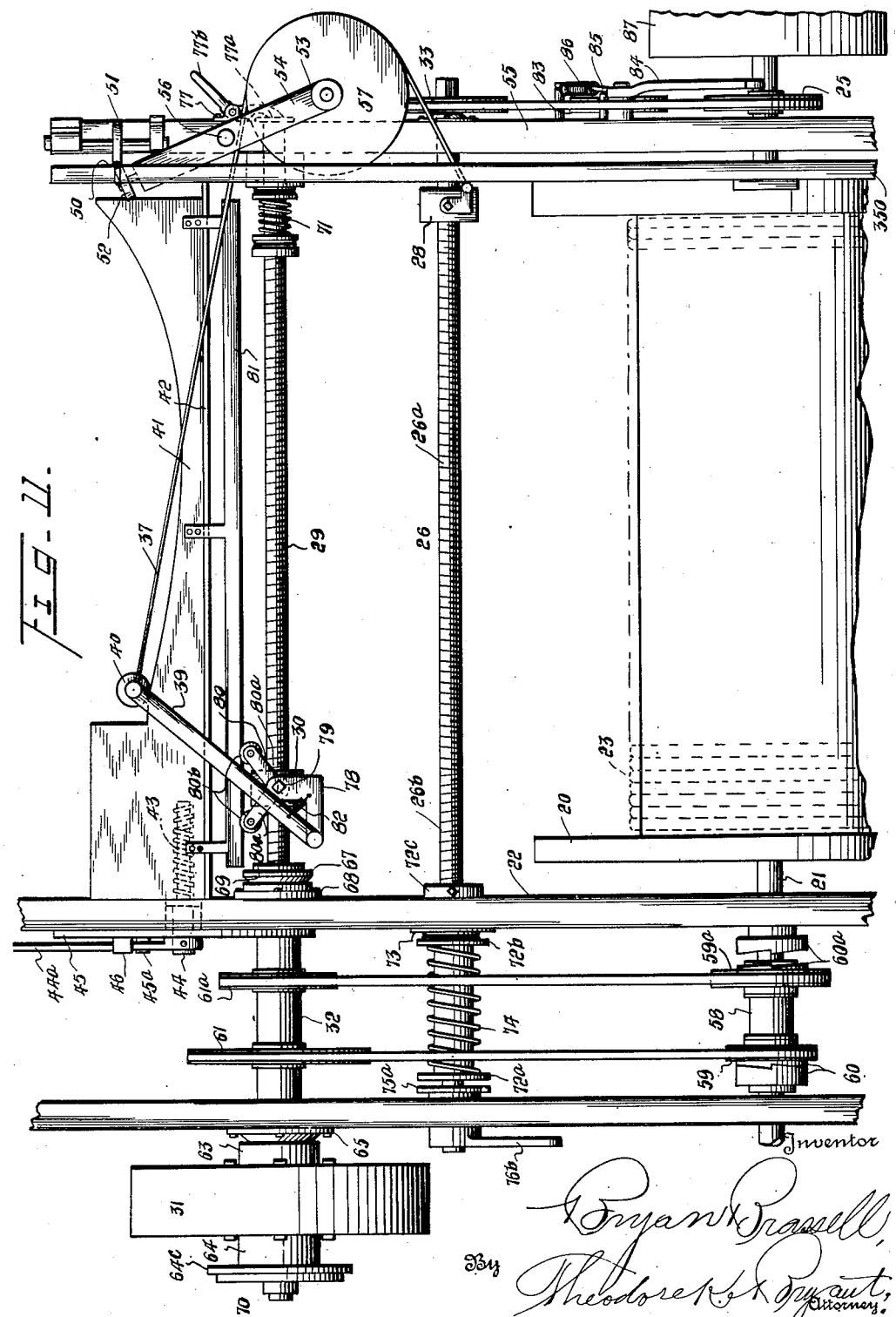

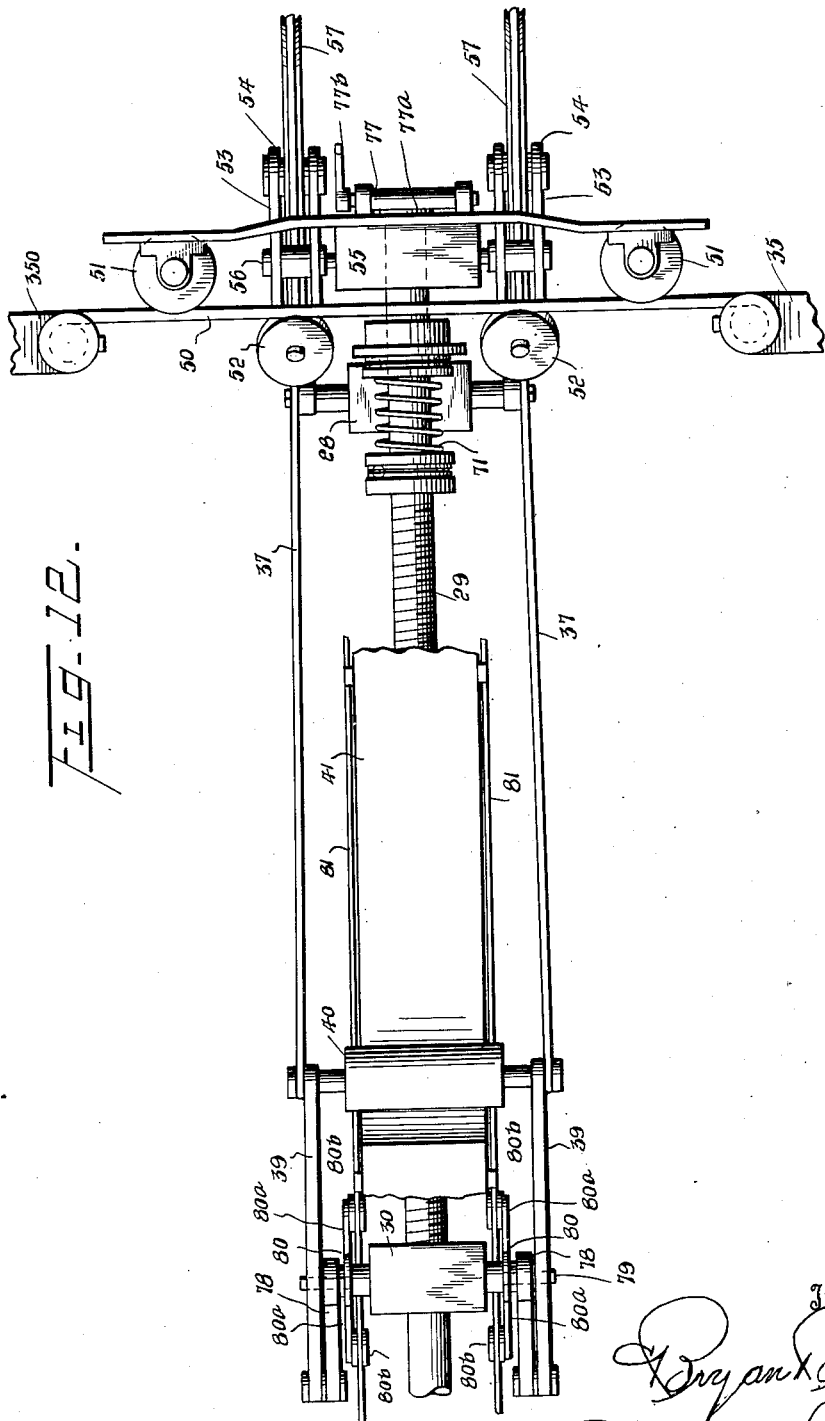

April 26, 1949. B. BRASSELL 2,468,652
CONTROL INSTRUMENTALITY
Filed July 20, 1946 11 Sheets-Sheet 7
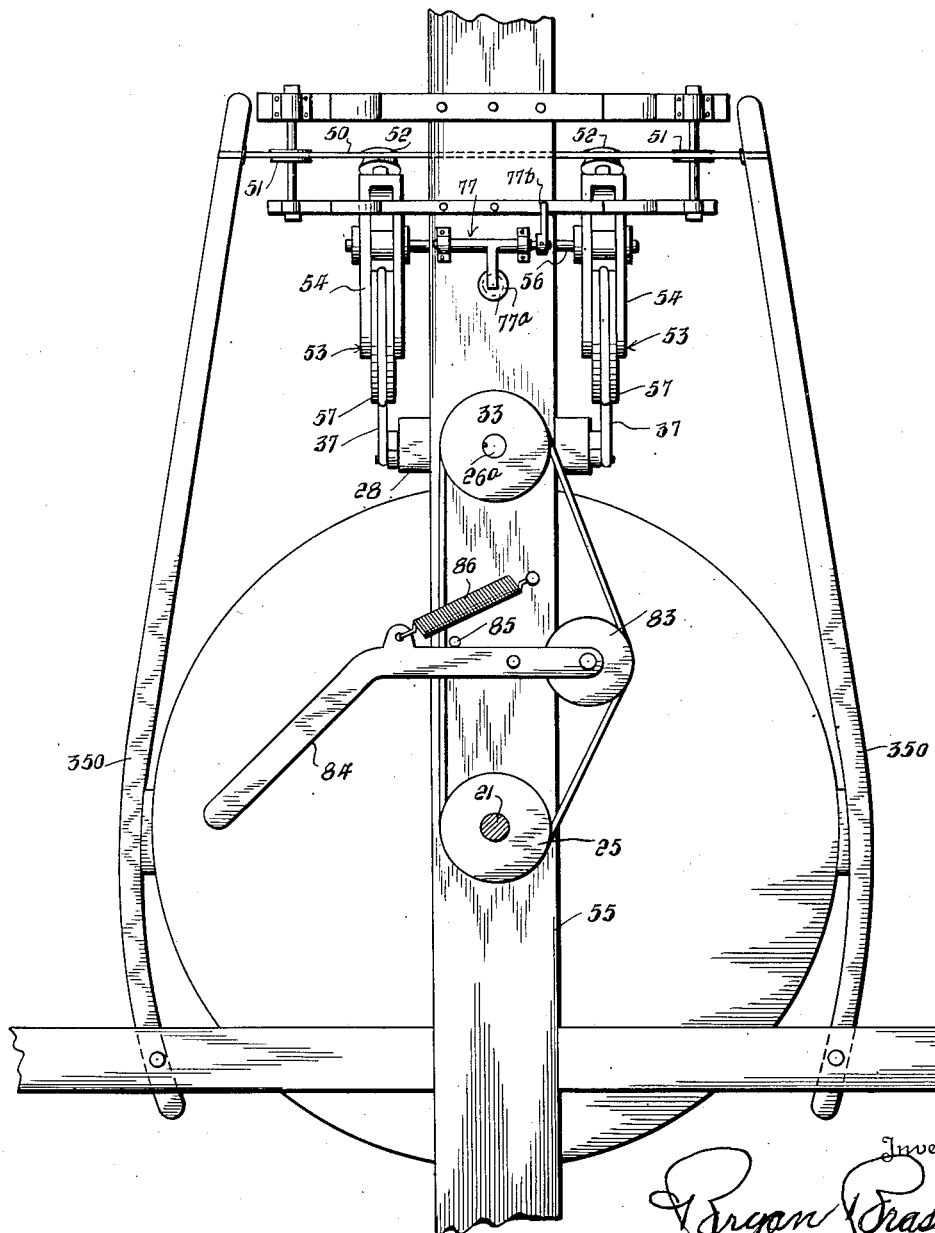

April 26, 1949. B. BRASSELL 2,468,652
CONTROL INSTRUMENTALITY
Filed July 20, 1946 11 Sheets-Sheet 8
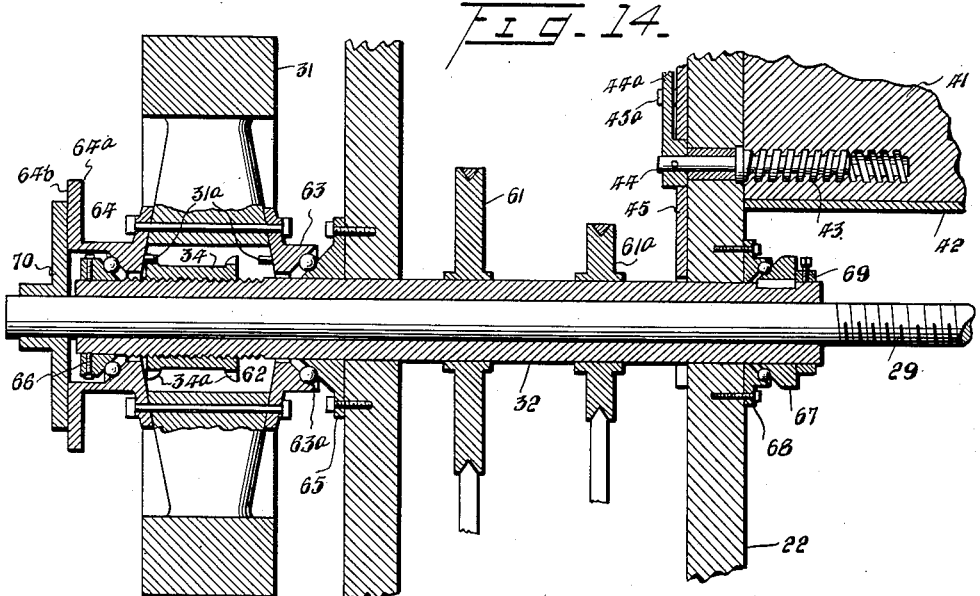
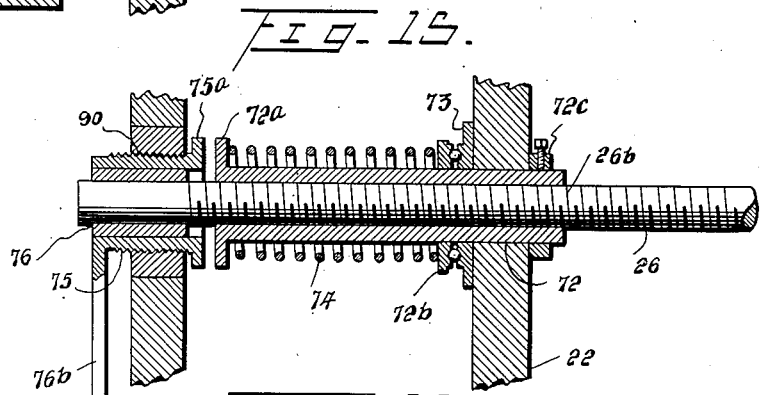
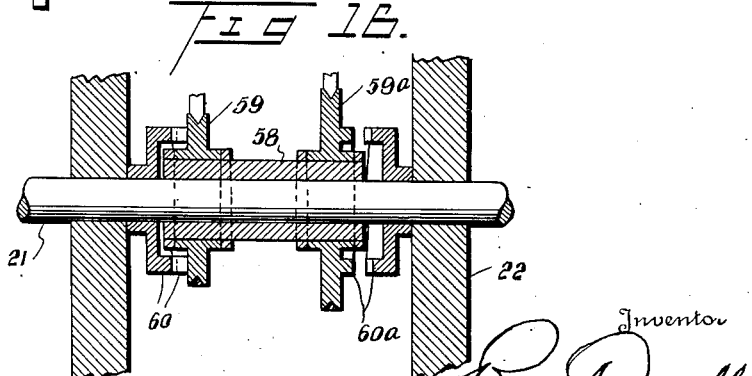

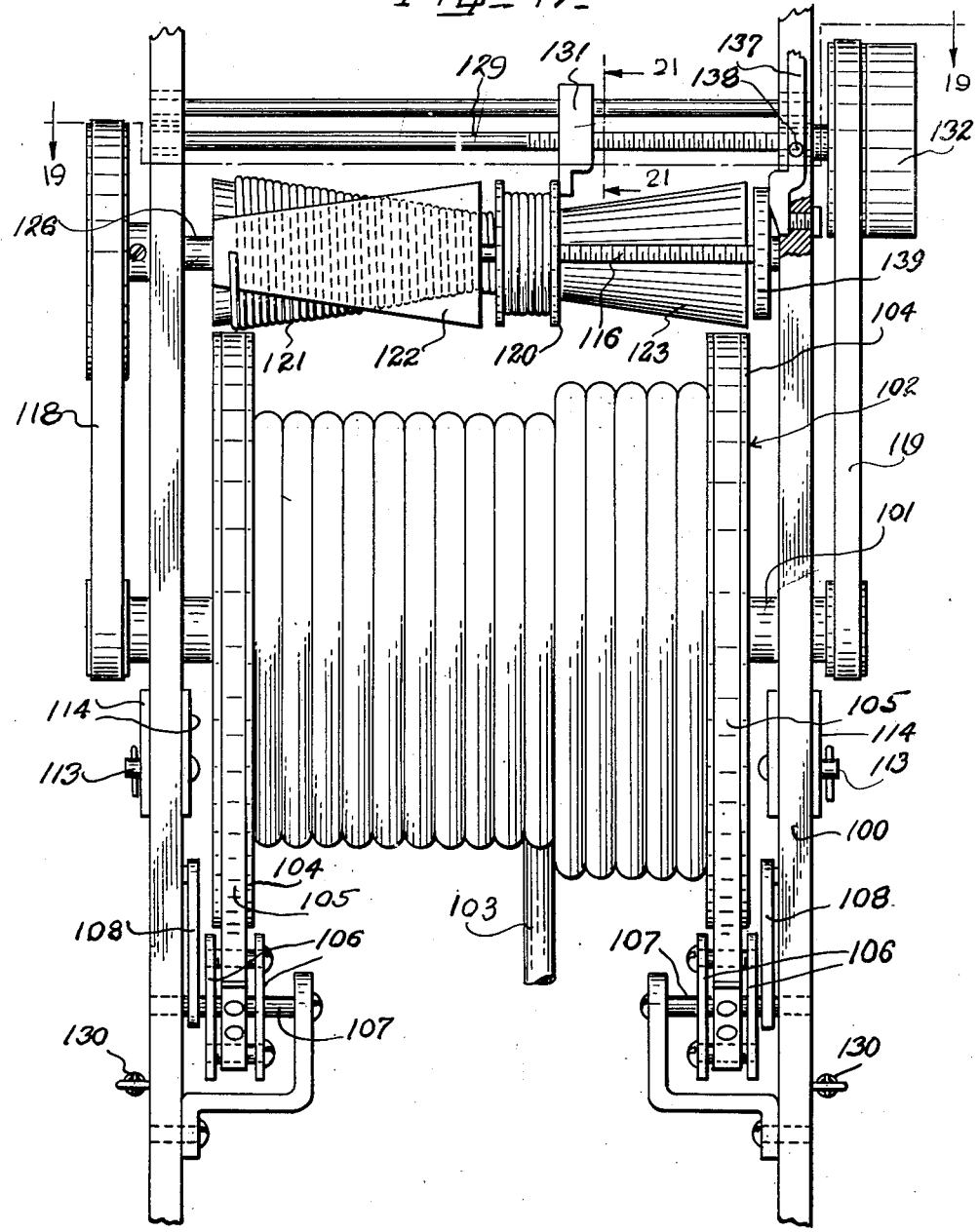

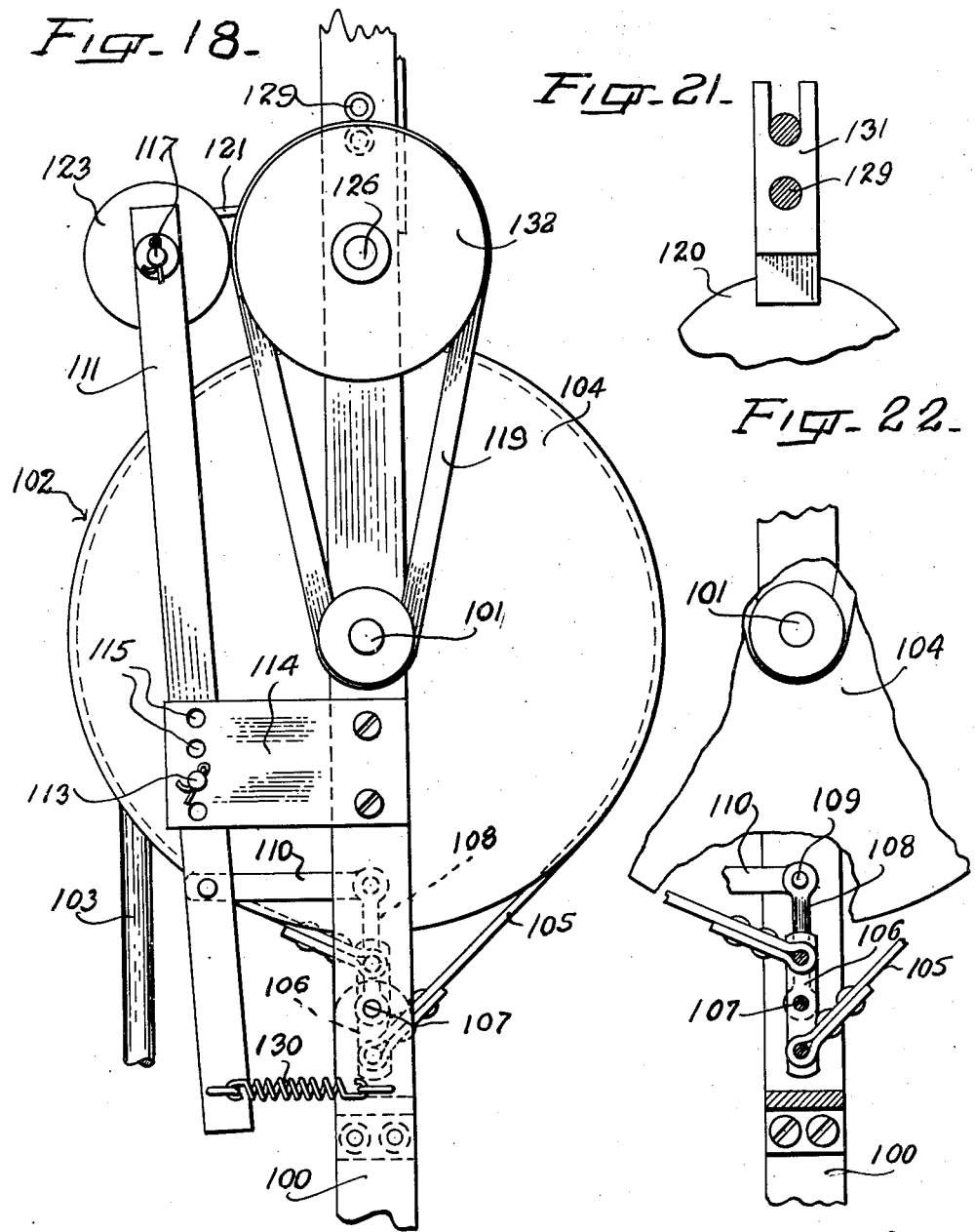

April 26, 1949.　　　　B. BRASSELL　　　　2,468,652
CONTROL INSTRUMENTALITY

Filed July 20, 1946　　　　　　　　　　11 Sheets-Sheet 11

Inventor
B. Brassell
By T.K. Bryant
Attorney

Patented Apr. 26, 1949

2,468,652

UNITED STATES PATENT OFFICE 2,468,652

CONTROL INSTRUMENTALITY

Bryan Brassell, Santa Rosa, N. Mex.

Application July 20, 1946, Serial No. 685,050

17 Claims. (Cl. 254—173)

This application is a continuation-in-part of my application Serial No. 517,148, filed January 5, 1944, now abandoned, and the invention relates to control instrumentalities as to apparatus and method, especially for a rotatable element or movement and automatically at a variable rate through a working cycle.

An important object is to provide a novel mechanism predicated on such a control and rotary movement and carried by a plane or other mobile body for expeditious launching or moving with minimum shock, a glider or other load or any equivalent, while the plane or mobile body moves relatively to the glider or load.

Another object is to provide a pick-up or launching mechanism for a glider or other load carried by and operable by a plane or body in flight or movement, producing a variable speed between the plane or body and glider or load by controllably paying out an element such as a flexible cable or rope.

A further object is to provide such a construction wherein the said element as it is paid out spins or rotates a reel or drum because of the weight of the hitched glider or other load, and rotation of the reel or drum controls a braking mechanism associated with the latter.

Still further an object is to provide such a unitary assembly or mechanism to be carried by a plane or other moving body wherein the spinning or rotation of the drum or reel draws on a braking mechanism and also at the same time initiates a variable movement to release the braking mechanism which may include a power-storing inertia wheel and associated "Bendix" drive or equivalent.

Since in practice the aforesaid release movement may not be more than approximately 5% or 10% less than the drawing movement to prevent the drum from paying out an excess amount of rope before the glider is started in movement, it is an important aim to provide means to increase said drawing movement over that which is constantly employed throughout the cycle of operation, but which ceases to function before the brake pressure becomes sufficient to move the glider or loader.

Again, an object is to provide in such a mechanism for the spinning of the cable drum or reel and inertia wheel at the beginning of a cycle of operation, with the inertia wheel associated with the brake-release movement to the end that its "Bendix" drive permits the release movement to become a power source independent of further rotation of said drum and to control the unwinding of the line or cable from the drum by releasing brake pressure if and when the brake pressure effects a greater reduction in the unwinding movement than the predetermined control. The release movement accomplishes this result by becoming greater than the drawing movement and when control is attained the two movements are in unison or move at the same rate.

In addition, it is aimed to provide the different generic and specific features of each of the different forms of the invention hereinafter described and illustrated in the accompanying drawings, as examples only of practical embodiments.

In said drawings, in which similar reference characters indicate similar parts in each of the views:

Figure 1 is a view in side elevation of one form of the invention.

Figure 2 is an end elevation.

Figure 3 is a sectional view taken on line 3—3 of Figure 2.

Figure 4 is a sectional view taken on line 4—4 of Figure 1.

Figure 5 is a sectional view taken on line 5—5 of Figure 1.

Figure 6 is a sectional view taken on line 6—6 of Figure 1.

Figure 7 is a view in end elevation of a portion of the relief mechanism.

Figure 8 is a sectional view taken on line 8—8 of Figure 1.

Figure 9 is a diagrammatic view of one form of cam control structure.

Figure 10 is a diagrammatic view of a second form of cam control structure.

Figure 11 is a view in side elevation of a second form of the invention.

Figure 12 is a top plan view of the same, with parts broken away.

Figure 13 is an end elevation of said second form.

Figure 14 is a detailed vertical sectional view of the parts of the inertia wheel zone of the second form.

Figure 15 is a detail sectional view of the slack take-up mechanism of the second form.

Figure 16 is a detail sectional view of the speed-changing mechanism of Figure 11.

Figure 17 is a front elevation of a third or final form of the invention.

Figure 18 is a right-hand side elevation of the device of Figure 17.

Figure 21 is a detail section taken on the line 21—21 of Figure 17; and

Figure 22 is a fragmentary view corresponding to Figure 18 with parts broken away to better illustrate the brake band portion.

Figure 20:
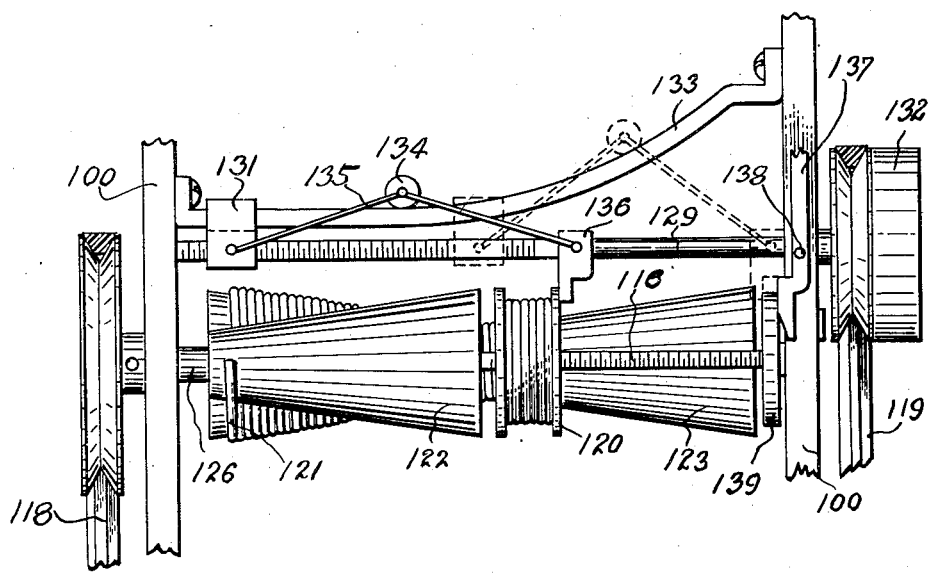
Figure 20 is a fragmentary view of a modified form of the upper portion of the structure of Figure 17 to include mechanism for variable speed effect.
Figure 19:
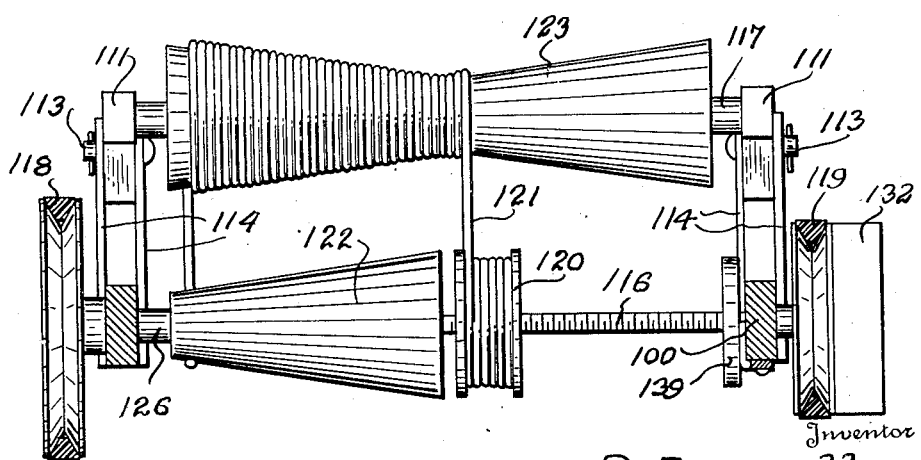
Figure 19 is a horizontal section taken on the line 19—19 of Figure 17.

Referring specifically to the drawings wherein like reference characters designate like or similar parts throughout the different views, reference character 20 indicates a drum or reel of suitable dimensions rigid on a shaft 21 journalled on a suitable main frame 22 carrying the various parts of the unit. A cable 23 of desired length and material is wound on the reel 20 with its inner end secured to the reel and its free end carrying an engaging device, for instance a hook (not shown) for connection to a load to be drawn such as a glider.

Fixed on shaft 21 is a pair of pulleys or other form of power drive mechanisms 24 and 25. One of said pulleys or the reel, for instance pulley 24, may be provided with a side face 24a as illustrative of a braking surface.

Reference numeral 26 indicates an exteriorly screw-threaded shaft suitably journalled in the said frame 22 above the reel 21, which carries a pulley 27 operatively connected to pulley 24 by a belt, so that the shaft 26 is rotated in synchronism with the reel shaft 21, and at the speed ratio determined by the respective dimensions of pulleys 24 and 27. Screw-threaded on shaft 26 is a non-rotatable line-drawing nut 28 which slides longitudinally of the shaft 26 as the latter is rotated and according to the direction of rotation. In service, the nut 28 is advanced from a position adjacent one end of the shaft, in the direction of the opposite end during the cable-withdrawing action, which latter action determines the speed of rotation of the shaft in that, as the speed of the reel 20 is decelerated due to braking action, the speed of shaft 26 is correspondingly reduced, and when the reel 20 stops, the rotation of the shaft 26 also comes to a stop. During retrieving of the cable, the reel shaft 21 is rotated in the reverse direction, causing shaft 26 to rotate in similar direction and thereby reverses the direction of travel of the nut to return it to its initial position.

Reference character 29 indicates a second screw-threaded shaft journalled in the frame 22 above and parallel to shaft 26. Shaft 29 carries a line-releasing nut 30 held against rotation and so as to travel longitudinally of shaft 29. Shaft 29, unlike shaft 26, is loose or free having no direct drive connection with reel shaft 21, but is shown as having an inertia wheel 31 keyed thereon, and arranged to be rendered active by a suitable clutch automatically engageable with the wheel 31 (by formation rotation) and automatically disengageable from the wheel 31 whenever the rotation speed of the wheel 31 is greater than that of a clutch mechanism driven from the reel shaft 21, so that the clutch mechanism is subject to reel speed variations, while wheel 31 after it has reached its speed, continues to rotate at substantially constant speed for a short period, which may be a predetermined number of seconds. Such clutch mechanism may be and is shown as a "Bendix" drive assembly, with a sleeve 32 of the assembly loosely mounted or journalled on shaft 29, and itself driven by a belt from pulley 25 on the reel shaft 21 to a pulley 33 on the sleeve 32. Sleeve 32 has a screw-thread 32a on which is mounted the assembly nut 34 having its advance end designed to engage a member, such as a pin 31a, carried by wheel 31, the nut having the usual weight characteristics usually found in the "Bendix" drive. The pulleys 27 and 33 may have the same or a different speed ratio.

In practice, rotation of reel 20 at the maximum speed rotates shaft 21 and the latter rotates shaft 26 through belted pulley 24 and 27. Shaft 21 also rotates sleeve 32 through belted pulleys 25 and 33. Sleeve 32 advances nut 34 through its engagement with thread 32a into operative engagement with pin 31a, resulting in rotating wheel 31 at the speed of the sleeve 32 at the instant of nut and pin engagement. As the speed of shaft 21 reduces, a concurrent reduction in the speed of sleeve 32 and nut 34 causes the pin 31a to reject or disengage the nut, due to the substantial constancy in speed of inertia wheel 31, this rejection continuing during the remainder of the cycle. Rotation of inertia wheel 31 applies to shaft 29 and advances nut 30 as long as inertia wheel 31 remains as an active drive source for shaft 29, which may be until wheel 31 runs down, or until the wheel 31 and shaft 29 are disconnected in suitable manner, as by mechanisms such as are employed in the second form herein described, and which are readily applied to this first form as well.

The respective drawing and releasing movements of nuts 28 and 30 are in connection with a brake lever 35, pivoted to frame 22, which cooperates with the aforesaid face 24a or equivalent. Lever 35 carries a pulley 36, over which is trained an open loop of a flexible brake-line or cable 37.

One end of the line 37 passes over a pulley 38 attached to frame 22 and disposed on the opposite side of the nuts to pulley 36 and is connected directly to nut 28. Connection of the other end of the line 37 is made indirectly to nut 30 through the medium of a follower having a pair of arms 39 having one end pivotally mounted on nut 30 with the opposite ends carrying a follower roller 40 whose pivot extends through the arms and has the other end of said line 37 directly secured thereto.

Disposed on frame 22 is a control face or cam structure 41, over which the roller 40 travels during the movement of nut 30, and upon the contour of which cam face 41 will depend the reactions to the movement of inertia wheel 31, the advance of nut 30 being at substantially constant speed and the advance of roller 40 being controlled by the contour of cam face 41. Cam structure 41 is adjustable or supported for shifting bodily parallel to the axis of shaft 29 on guides 42 carried by the frame. As one means to attain this end, the structure is provided with a threaded opening 43 fitted by a screw 44 which is journalled in an adjacent frame member and a plate 45 carried by the frame member and which has an abutment 45a against which an operating arm 44a of screw 44 normally rests. It will be understood that if the said arm is swung away from its normal position, the structure 41 will be shifted in the direction of brake line release and thus permit the roller 40 to correspondingly advance under the tension effect that is present through the presence of the set brakes. After completion of the retrieving action, movement of the arm 44a will restore the structure 41 to its normal position. Plate 45 has a series of openings 45b positioned at different arcuate distances from the face of abutment 45a so that a definite arcuate length of throw for arm 44a is obtainable by placing a removable pin 46 in a desired opening 45b.

To illustrate these reactions and their effect upon the braking development, Figures 9 and 10 are presented, these showing, diagrammatically, two different control face contours which, in practice, will produce substantially similar results, their differences resulting from the values of the speed ratio of the respective drives between the reel shaft and rollers 27 and 33; in Figure 10, the ratio being assumed to be the same for both rollers, while in Figure 9 the ratio being assumed to present the speed of roller 33 as one-half that of roller 27. The diagrams are based on certain assumed structural and operational conditions of the unit, and can serve not only to indicate the reactions but as a basis for "laying-out" the control face 41 to meet any desired form of unit operation. The control face structure is usable with not only the present form but with all forms disclosed herein by simple reversal end for end as can be seen from the position of the curve of cam face 41 in Figures 1 and 10, for instance.

For example, it is assumed that rotation of the reel 20 by cable unwinding will, at the instant of start of activity of the inertia wheel 31, be at a rate equivalent to ten threads of shaft 26 per half second and that the reel 20 will be brought to a stop, together with shaft 26, by the braking action at lever 35 and face 24a, in five seconds time, with the braking action developed at a uniform rate. In the form of Figure 10 the speed of shaft 29 at such starting instant is the same as that of shaft 26, while in Figure 9 the speed of shaft 29 is assumed to be one-half that of shaft 26 and in both cases, the speed of shaft 29 is assumed to remain constant during the cycle period of five seconds. Since the rate of brake development is assumed to be uniform, such brake development would present the equivalent of two threads per second, or one thread each half second; in other words, the control face is assumed to produce the equivalent of a nut advance by nut 30 of one thread less than that of the advance of nut 28 during the same period, although nut 30 is actually advancing at constant speed while the advance of nut 28 is controlled by reel speed deceleration of constant rate such that the advance of nut 28 is progressively one thread less in each half second period through the progression.

In the showing of Figure 10, it is apparent that at the assumed rate of one thread per half second, with the opening rate of ten threads per half second (nut 28), the next increment of time would have the starting rate of nine threads, the next increment as eight threads, etc., until the final time increment would start at the rate of one thread per half second; this permits of a knowledge of the assumed position of one end of line 37 at the beginning and ending of the time increments. On the contrary, the assumed constancy of speed of advance of nut 30 during the cycle permits of providing equal spaced positions of nut 30 at similar time periods; with these latter points as centers, and with a radius determined by the angularity of follower 39, arcs can be drawn relative to a line parallel to the axis of shaft 29. By transferring the distance of the found point of one arc relative to such line to the succeeding arc, it is possible to ascertain the needed position of the point on that arc, by a simple consideration of the conditions present.

In this particular form the development is such in the later or last increments of time, that there is a tendency to reverse the direction of progression of the points; that is, during the period when the reel is approaching the end of its rotation, and consequently, it is possible to increase the rate of brake application, by stopping the advance of nut 30, which is accomplished by providing a face perpendicular to the base line to advance of roller 40 but permit it to travel upward as nut 30 advances. The conditions would then provide a slightly earlier closing of the cycle causing the reel to come to rest in slightly less than the five seconds of the cycle.

The contour face of Figure 9 differs from that just described, and results from the fact that the speed of shaft 29 has been reduced to half that utilized in the Figure 10 form, due to the change in the ratio of the drive connections between reel shaft 21 and sleeve 32. In the previous assumptions the advance of nut 30 has been considered as ten threads per half second while in the form now being described, the advance of nut 30 is assumed to be five threads per half second. The assumptions relative to shaft 26 and nut 28, the time length of the cycle, and the development of the progressive brake pressure increase at the uniform rate of two threads per second, remain as before. The two structures are assumed to produce duplicate results in the presence of the change in the assumed constant rate of advance of nut 30.

The effect produced by this change in speed of advance of nut 30 can be understood from the fact that while in the form of Figure 10 the rate of advance of nut 30 never passed below the rate of advance of nut 28. In the present form, the earlier time increment periods have the rate of advance of nut 30 less than that of nut 28, and become superior at a later time. As a result, the conditions during these earlier periods are materially changed. If the one thread per half second rate of brake pressure development is to be maintained, it is necessary to provide an artificial increase in distance of advance of roller 40 to compensate for the shorter advance of nut 30. This artificial lengthening of the advancing stroke of the roller to the point where it reached the same length as in the previously described form, is provided through the control face in connection with the line drawing action of nut 28. Instead of placing restraint on the advance of the roller as in the previously described form, the contour of the face permits the roller to advance at a faster rate than nut 30 as nut 28 draws the line. By controlling the distance through which such action can take place, together with the rate, it is possible to produce the same result on the lengthening of the distance between nut 28 and roller 40 (along line 37) as is provided in the other form.

Presuming operation, as the plane carrying the present invention passes over the load such as a glider, the free end of cable 23 is wound on drum 20 carried by the plane and the drum 20 and shaft 21 will be spun, provided brake 24a—35 is released. As said drum is geared directly to a movement that draws on brake lever 35 as the drum rotates, the drum will set its own brakes. The rotation of drum 20 starts a similar movement for the release of the brake somewhat less than that of the drawing movement and which will become isolated from or independent of the drawing movement, and the movement of which will become less per unit of time as a cycle progresses. Since the release movement is less than the drawing movement before the rotation of drum 20 is brought under control, it will not prevent the drawing movement from bringing the rotation of drum under control. When the brake pressure results in a reduction in the rotation of the drum from that of free rotation, the glider will start to move. While the ratio between plane and glider movement is great at this part of the cycle, no leverage system is involved, and it has required as much power to start the glider from a position of inertia of rest as that to tow it at a one-to-one ratio with that of the plane. Therefore, the increase in brake pressure must not only discontinue, but a part may need to be released if the operating cycle is to continue and brake pressure prevented from stopping rotation completely. As previously explained, the release movement is equipped with its own power source and is connected to drum 20 by the "Bendix" drive or its equivalent and the drawing movement geared directly to said drum. The brake pressure has therefore reduced both the rotation of the drum and the drawing movement of brake lever 35 but has not reduced the release movement and, if the brake pressure results in the drum losing more speed of rotation than that which is predetermined, a part of the brake pressure will be released, permitting the drum to regain speed of rotation, it being understood that the object is to reduce rotation with the tendency greater than that permitted, except at the start of a working cycle.

The foregoing presents the invention in but one form, and it is obvious that this form may be changed, elaborated upon and refined. One of such modified forms is illustrated in Figures 11 to 16, and will now be referred to in detail.

One of the fundamental distinctions in the modified or second form is the fact that the braking is applied to the periphery of the reel 20. Instead of the nuts 28 and 30 traveling in the same direction during service, the threads of their shafts are arranged reversely to cause them to travel in opposite directions.

As indicated in Figure 13, the single braking zone or structure of Figure 1, is replaced by a pair of braking zones or structures which are located at diametrically opposite locations of the brake drum 20, specifically being two brake arms 350 having their lower ends pivoted to the main frame and projecting upwardly to a point above the location of the flexible line, with the upper ends of the two arms connected by a flexible element or cable 50. The frame carries a pair of rolls 51 adjacent such upper ends over which the connection 50 passes.

An oscillatory unit or mechanism, indicated generally at 53, includes a pair of inverted U-shaped brackets 54, one located on each side of a vertical frame member 55, and the brackets 54 are pivotally mounted at an intermediate point on a fixed axle 56 carried by frame member 55. Rollers 52 over which flexible element or cable 50 passes, are mounted at the upper closed ends of brackets 54, while the legs of such brackets carry the shafts of sheaves or rollers 57, said sheaves or rollers 57 are traversed by parallel sections of the brake line or cable 37, and such sections are connected to nut 28 and the axle of roller 40.

As is apparent, the variations in distance between roller 40 and nut 28, varies due to the differential set up by the angle of the follower 39 and the travel of nut 28, and since the actual length of line 37 remains constant, the difference is compensated for by movement of the oscillatory mechanism 53 on its pivot, the sheave end of the mechanism advancing toward the left in Figure 11 as the linear distance increases. Rocking of the mechanism by such sheave movement advances rollers 52 in the opposite direction, applying pressure on cable or connection 50 to shift the intermediate portion of the connection, with the result that the ends of the connection are drawn inward, thus shifting the upper ends of arms 350. The leverage relationships are so arranged that advance of mechanism 53 through a unit of distance will provide a definite increase in braking value, thus controlling the rate of braking increase per unit of distance travel of nuts 28 and 30.

In the simple form, shaft 26 and sleeve 32 are shown as driven at equal speeds, and such arrangement can obviously be employed in the second form; but for the purpose of indicating the possibility of variations in this respect, this second form has the sleeve 32 driven at half the speed of shaft 26, which utilizes the form of control face 41 shown in Fig. 9, and since this form also contemplates retrieving under power conditions, provision is also made for speed change conditions, since it is desirable to provide approximately equal speeds between shafts 26 and 29 during the power-retrieving action. Hence, as indicated in Figure 11, the drive connections between shaft 21 and sleeve 32, are arranged to provide for selective speed change conditions. This feature may be employed in the first form if desired.

Said speed change mechanism includes a suitable manually slidable carrier 58 on shaft 21, which forms a support for a pair of loosely-mounted drive rollers or gears 59, 59a, which are shiftable axially with the carrier. Said rollers or gears are spaced apart, and each has its outer side provided with one of the complemental members of a clutch assembly 60, 60a, the opposite members of which are fixedly on shaft 21 to rotate therewith. The clutch assemblies are so formed that each drives in one direction, with the drive direction of one assembly opposite that of the other assembly.

Sleeve 32 carries a pair of driven rollers 61, 61a, operatively connected respectively with rollers 59, 59a, by suitable belts or other drive connections. The respective connected rollers for example are dimensioned so that one pair 59a, 61a, in Figure 11 presents approximately the same speed of rotation of the sleeve 32 as is present with shaft 26 driven by operatively connected rollers 24 and 27, while the other connected pair 59, 61 in Figure 11 is arranged to drive sleeve 32 at half the speed of shaft 26 to meet the conditions presented by the form of control face 41 shown in Figure 9.

The approximately equal speed between connected rollers 24 and 27 and 59a, 61a, is illustrative only, and will depend somewhat upon the length of travel of nuts 28 and 30 in completing the cycle. While nut 30 will travel at half the speed of nut 28 when the cable is being unwound, nut 30 is traveling at constant speed while nut 28 is traveling at a reducing speed (from maximum to zero) during the cycle. Therefore, the nuts will travel approximately equal distances, although there is a small variation. When, therefore, the shaft 21 is reversed for power retrieving, and carrier 58 is shifted, the speed of shaft 29 is made such, through the dimensions of connected rollers 59a, 61a, that both nuts are returned to their normal starting positions.

When the carrier 58 is shifted to render roller 59 cooperative with shaft 21, sleeve 32 will be rotated at half speed and since roller 61a is secured to the sleeve, it will also be rotated and hence rotate roller 59a. Since the latter, however, is free to rotate, the connected rollers 59a, 61a simply idle. When the carrier 58 is shifted to render rollers 59a, 61a active to drive sleeve 32, connected rollers 59, 61, will simply idle.

The "Bendix" drive feature of the first form is used in the second form and the control face is of the type shown in Figure 10. However, when the control face 41 is of the type of Figure 9, the change-speed arrangement described is employed to drive the sleeve in its opposed direction, and hence it is essential that the Bendix drive connections be changed in order to meet the conditions of the different speeds.

A simple means for meeting these conditions is shown in Figure 14 where wheel 31 is shown as of larger dimensions axially and has an axial opening 62 of extended length through which sleeve 32 extends and within which nut 34 is threaded on said sleeve. The wheel 31 is supported by a pair of hub members 63, 64 and bolted together through the wheel body. Member 63, located on the inner side of the wheel, presents a face 63a which forms a face of a thrust bearing the opposite face of which is carried by a member 65 supported by the frame and through which the sleeve freely passes. Member 63 overlies the inner end of opening 62, being itself formed with an axial opening through which the sleeve freely extends; the inner face of member 63 carries a pin 31a within the range of travel of nut 34. Member 64 is of generally similar but of opposite formation to member 63 and is located on the outer side of the wheel body, and has its thrust bearing face cooperative with a face carried by a member 66 secured on sleeve 32. Member 64 differs mainly from member 63 as it has an annular radial flange 64a forming a friction face 64b.

Hence, wheel 31 carries a pair of inwardly extending pins 31a, one opposite each end of nut 34. When sleeve 32 rotates in one direction, the nut will be advanced by the sleeve threads into engagement with the pin 31a at one side of the wheel, thus setting wheel 31 in motion, and when the speed of the sleeve slows due to reduction in speed of shaft 21, the nut is rejected, similarly to the Bendix drive action, but moves only a limited extent axially of the wheel, since the sleeve rotation continues to the end of the cycle, and the nut, after rejection, will quickly lose its motion independent of the sleeve and rotate with the latter. Obviously, if the sleeve be rotated in the opposite direction, the nut will be advanced toward the opposite side of wheel 31 and engage the second pin 31a to thereby rotate the wheel. Since this takes place during the cable-retrieving period, during which the speed of shaft 21 remains constant, the speeds of sleeve and wheel remain the same during the retrieving period, with the result that there is no rejection of the nut at such time, but when the normal cable-unwinding action is resumed, the nut will be thrown out of such position and advanced to the opposite end to begin a new cycle.

As indicated in Figure 14, the sleeve 32, while loose on shaft 29 and rotatable relative to the supporting frame, is, however, firmly held against longitudinal movement. The inner end of the sleeve carries a member 67, keyed to the sleeve, and forming a portion of thrust bearing 68 carried by the frame, member 67 being held to position by a fastening ring 69 secured to the sleeve, the arrangement preventing longitudinal movement of the sleeve in one direction, while the mounting of wheel 31 between member 66 (on the sleeve) and member 65 (on the frame) prevents longitudinal movement of the sleeve in the opposite direction.

Shaft 29 is rendered inactive by providing the drive between wheel 31 and the shaft through a coupling device, one member of which is the face 64b heretofore referred to, with the cooperating member in the form of a disk 70 secured to shaft 29 beyond wheel 31. When the disk 50 and face 64b are in close contact, rotation of wheel 31 will rotate shaft 29 at the top desired speed. If the contact be a slippage contact, shaft 29 will rotate at reduced speed, and if the contact is broken, the wheel will rotate but shaft 29 will not be driven. The first and last of these conditions are employed in taking up the slack. To permit these positions to be obtained, shaft 29 is mounted to permit longitudinal movement, being held in one extreme of such movement (with face 64b and disk 70 disconnected) by a light spring 71 (Figure 11) carried by the shaft and which tends to break the coupling relation, the spring having sufficient power to shift the shaft to such extreme when slack is present in the brake line 37, but insufficient to prevent the pull of the taut brake line on the contactor from drawing upon shaft 29 to move it to its opposite extreme of longitudinal movement represented by contact of disk 70 with face 64b. Hence, when there is slack in the line, the coupling will be inactive, but will be made active by the brake line 37 becoming taut and pulling on the follower 39 and roller 40 and therefore on nut 30, to move the shaft and complete the coupling, thus ensuring that at the time the bracket 39 and roller 40 begin their calibrated advance, the brake-line will be actively engaged in applying brakes.

To provide rapid taking up of the slack, shaft 26 is also made longitudinally movable, with its longitudinal movement under control from different sources, one of which is shown in detail in Figure 15, and will now be described. Shaft 26 has two thread zones, zone 26a being that traversed by nut 28 with its thread lead opposite the lead of the threads of shaft 29, as heretofore pointed out, and a thread zone 26b beyond and independent of zone 26a, with its threads of opposite lead from these of zone 26a. Zone 28b has an elongated sleeve member 72 threaded thereon and provided at one end with a radially extending flange 72a positioned between a pair of frame members, the sleeve having a length sufficient to extend through or partially through one of such frame members and through a thrust bearing member 73 carried by the face of the frame member confronting the flange, the complemental member of the thrust bearing being an annular member 72b loosely mounted on the body of the sleeve 72. The sleeve also carries a spring 74 between the flange 72a and member 72b.

The end zone of shaft 26 extends through an opening 90 formed in the second of the frame members, which opening is internally threaded and receives an annular operator 75, externally threaded and mounted on a loose bushing 76 carried by shaft 26. The inner end of the operator 75 is provided with a flange 75a, while the outer end carries a handle 75b by which the operator can be rotated to move flange 75a into and out of contact with flange 72a. During normal operation of the unit, the flanges are spaced apart as shown in Figure 15, due to stop 72c.

In practice, and assuming that the brake line 37 is slack and must be taut in order to begin the brake-applying action, the beginning of the cable-unwinding action causes rotation of the reel and shaft 21, with resultant rotation of shaft 26 and sleeve 32. Rotation of shaft 26 causes nut 28 to advance and draw on the cable, and since the coupling between wheel 31 and shaft 29 is inactive at such time, the full effect of the advance of nut 28 is applied on the slack line. This condition alone would ultimately provide removal of the slack, but where the slack is of considerable amount, the reel rotation required to do this would provide an undue length of unwound cable in advance of brake application. To quicken the slack elimination, handle 76b is rotated to move flange 76a into contact with flange 72a and retained stationary in such position which causes sleeve 72 (which rotates with shaft 26 excepting during contact of the flanges) to become stationary and function as a stationary unit on the shaft. Obviously, rotation of the shaft within the nut will cause shaft 26 to advance bodily, carrying nut 28 with it, with the result that the brake line is being drawn not only by the travel of nut 28 on shaft 26 but also by the advance of shaft 26 itself and this combined advance of nut 28 continues as long as flanges 72a and 76a remain in contact.

As the last of the slack is eliminated, a series of three actions takes place, viz.: shaft 29 is drawn to complete the coupling of the shaft 29 with wheel 31; shaft 26 is drawn to break the contact of flange 72a and 76a, and brake application begins (the particular order of development of these depending somewhat upon the various resistances, but all are completed with great rapidity). The series of actions is due primarily to the fact that the actual length of the brake line 37 remains constant, while three points in the line are yieldable, namely the two ends carried by nut 28 and roller 40 respectively, and the intermediate zone represented by rollers 57 of the oscillatable or rocking unit 54. Hence, the order of development of the series will depend somewhat on the order in which the resistances at these points may yield.

For instance, it is apparent, that as soon as the brakes contact the reel with any material pressure, there is a physical resistance provided active on the upper end of unit 54 against change in connection 50; hence rollers 57 will not yield as long as it is possible for either end of line 37 to yield. If spring 71 is of less resistance than spring 74, the initial yield would then be at the roller 40 end of line 37 with resultant shift of shaft 29 against the action of spring 71 and thereby operatively connect wheel 31 with shaft 29 to rotate the latter. The yield can be understood from the fact that since roller 40 is in contact with the control face, arm 39 cannot swing arcuately due to such contact; hence, the roller will be drawn forward, drawing on nut 30 which in turn advances shaft 29, until disk 70 engages face 64b which prevents further advance of the shaft. Since the brake contact also provides a dominant resistance with respect to spring 74, it is apparent that as soon as advance of shaft 29 to its active position ends, the yield point of line 37 will be transferred to shaft 26 through the medium of nut 28, the advance of which on shaft 26 providing a pull in opposition to spring 74. Under this pull, sleeve 72 (which has threaded connection with shaft 26) is also drawn, breaking the engagement of flanges 72a and 76a, thus permitting sleeve 72 to rotate with the shaft; the pull on shaft 26 obviously compresses spring 74, permitting shaft 26 to move in the direction of its normal position until spring compression sets up a stop effect on such shaft movement. During this movement of shaft 26, the position of nut 28 relative to the frame does not materially change since its anchored position relative to line 37 and the dominance of the brake contact cause the shaft rotation to serve to provide the drawing effect on the shaft. In other words, sleeve 72 serves to draw shaft 26 and nut 28 thereon in one direction, while nut 28 serves to draw the shaft and sleeve 72 in the opposite direction during these shifting movements of shaft 26.

These operations follow each other in rapid succession, and result in placing nuts 28 and 30 in the desired positions for providing the controlled development of the braking power, it being understood that after shaft 26 and 28 become stable as to position, the only point to yield in the brake line 37 is then in its intermediate zone with the yield developed by the fact that the positions of the line ends are then determined by the travel of nuts 28 and 30 as determined through the control face 41. As soon as contact is broken between flanges 72a and 76a, the previous combined action of the advance of nut 28 and shifting of shaft 26 in rapidly taking up slack comes to an end, to be followed by the temporary stationary positioning of nut 28 during the shift of shaft 26 in the opposite direction, after which nut 28 provides the only advancing agent for this end of the line. With both ends of line 37 thus definitely held from yielding, the full value of the controlled nut movements is applied to rollers 57 to force the rocking of unit 54 and thereby progressively develop the brake application through connection 50.

This second form also discloses a changed form of follower mounting (Figures 11 and 12), desirable because of the possibility of bodily movement of shaft 29, and the calibrated form of the control face, with its possibility of the use of a longer radius of swinging movement of the arm. Hence, as indicated in Figure 11, the lower end of arm 39 is not pivoted directly upon a pivot carried by nut 30 but is carried by a bracket 78 carried by nut element 79, the latter being shown as non-circular in cross-section to retain the follower in fixed relation with nut 30. To prevent possible canting of the nut and such element in directions to tend to bind the nut, element 79 also carries a fixed trolley-like member 80 formed with a pair of arms 80a, each carrying a roll 80b, these rolls being adapted to travel along a track 81 carried by the control face. These assemblages are duplicated on opposite sides of the control face (Figure 12). If desired, arm 39 may be connected with follower 78 by a spring 82, to assure retention of roller 40 with control face 41.

As is apparent, the fact that both shafts 26 and 29 are shiftable longitudinally in this second form tends to render the specific starting point of the actual controlled development of the braking pressure variable within certain limits due to the fact that the amount of slack in brake line 37 will determine the position of nut 28 at the time the active control cycle begins. But this condition is immaterial since the thread zone 26a is of sufficient length to permit travel of nut 26 throughout its cycle, even though the slack may be somewhat excessive. Springs 71 and 74 are of such resistance values, and the succession of activities take place at such speeds, that the active cycle of the control travel of the opposite ends of brake line 27 begins substantially at the same instant, and the position of the end at nut 28 relative to the frame is not critical; if desired, a greater variation in spring differentials may be provided by arranging the control face with an introductory zone over which roller 40 can travel through advance of nut 30 before the wheel reaches the beginning of the calibrated portion of the face. With the zone extending parallel with the axis of shaft 29, there would be no change in brake pressure while traversing the introductory zone.

Referring now to the third or final modified form of the invention disclosed in Figs. 17 to 22, the mechanism thereof increases the amount of brake line or cable which it is practical to employ, and thus increases the leverage system for the control. For instance, the brake lever or mechanism is operated by the movement of the brake line, and the more rapid movement of line permits a longer leverage to obtain the desired effect. Furthermore, at the beginning of a working cycle the reel does not start under control, but must be brought under control by a very slow movement of the brake lever in ratio to the amount of brake line drawn, whereas if the reel is not brought under control rapidly an excessive amount of rope will be unwound. More specifically, 100 represents the main frame journalling a shaft 101 to which a reel 102 is fastened, the reel thus being mounted for spinning movement as a cable or line 103 secured thereto is resisted by attachment to a glider or other load. The brake action is applied against the end disks or flanges 104 of said reel or drum as by means of a pair of flexible bands 105 of metal, leather or any other suitable material. Said bands at their terminals are secured to the ends of link levers 106 pivoted on a shaft 107 mounted by the main frame 100. Rigid with the shaft 107 is a crank 108 pivoted at 109 to an arm 110 rigidly extending from generally vertically extending levers 111. Levers 111 are pivoted at 113 to plates 114 secured to the framework 100, and such pivots 113 are selectively applicable to series of openings 115 in the levers 111 and plates 114 according to the amount of leverage desired. Coil-springs 130 secured to the framework and to the levers function to apply the brakes.

Rotatably mounted in the levers 111 and spanning them adjacent the upper ends is a shaft 117. Both shaft 126 and shaft 129 are journalled in and rigidly carried by the frame 100. The shafts 126 and 129 have the same motion and effect the same functions and results as the shafts 26 and 29, respectively, in the preceding forms.

The spinning of shaft 101 through a belt and pulley drive 118 rotates the shaft 126, while the same spinning motion of said shaft 101 through a belt and pulley drive 119 rotates the shaft 129. These movements 118 and 119 will permit a free running clutch effect for the driven pulley when the movement for a working cycle is only for a few revolutions. Screw-threaded to slide while rotating on the screw-threads of a shaft 116 journaled at one end in framework 100 and at its other end in pulley 122 and shaft 126, is a reel 120. With one end of a line or cable 121 wound on reel 120 and the other on one end of a conical pulley 122, rigid on shaft 126, as a work cycle progresses, the line 121 will be unwound from a double-ended conical pulley or reel 123 journalled for spinning on shaft 117. It will be realized that the levers 111 carry the double-ended pulley 123, and that the motion of such levers is controlled by controlling the unwinding of the line 121 from the reel 120. The rotating conical pulley 122 draws the line obtaining its power from the rotation of the drum 102. Such drawing of the line rotates the double-ended conical pulley 123 which in turn draws the line from reel 120. By permitting free rotation of reel 120, double-ended conical pulley 123 will rotate as a counter movement permitting pulley 122 to draw an equal amount of line from the reel 120 as it draws from the double-ended conical pulley 123 without moving the brake-levers 111, provided said levers have the slight resistance offered by springs 130 or the equivalent. If reel 120 is prevented from rotating, pulley 123 will be drawn toward pulley 122, resulting in the tightening of the brake-band 105 on the flanges of the drum 102. Controlling the rotation of reel 120 will likewise control the rotation of drum 102 through a leverage system and the rotation of reel 120 is controlled by mounting it on the threaded rod portion 116 and controlling its rectilinear movement. As a working cycle progresses, a release nut 131 threaded on shaft 129 moves from right to left on the latter shaft, permitting the reel 120 to follow on the screw-threads of shaft 116. The belt and pulley drive at 119 includes a weighted pulley 132 on the shaft 129 to act as an inertia wheel to provide a free running effect for the movement of the release nut 131.

A variable speed effect may be obtained by the cones or pulleys 122 and 123 drawing more brake-line 121 to each revolution of the drum 102, and as a cycle progresses or where the installation will permit a cam control, a cam element 133 as in Figure 20, may be employed to be followed by a roller or element 134 carried by a flexible element 135 connected to the release nut 131 and to a plate 136. The shaft 116 is normally held from rotating by the brake effect of a lever 137 pivoted to frame 100 at 138 against a plate 139 mounted on the shaft 116, but the plate may be released to permit rotation of the parts with the reel to increase the amount of line released or to release the brake at the end of the cycle by rotating the rod.

While I have herein disclosed several forms of the invention and indicated various ways for its use, it will be understood that the disclosure is more or less illustrative of various fundamentals which are present and upon which the invention relies. Obviously, the exigencies of service, or the desires of a user, may require changes or modifications therein, whether in the particular fields named or other fields for which the invention may be adaptable. Hence, I reserve the right to make any and all such changes or modifications therein as may be found necessary or desirable in meeting the exigencies of use in such fields, insofar as the changes or modifications may fall within the spirit and scope of the invention, as expressed in the accompanying claims, when broadly construed.

I claim:

1. In mechanism of the class described, a drum, means mounting said drum for spinning, a normally-released brake device associated with said drum, a flexible load-draft means mounted for movement to apply the brake device through motion of said drum, and means operable through motion of said drum to apply releasing movement to the flexible load-draft means independently of and simultaneously with the movement to apply the brake device.

2. In mechanism of the class described having a rotatable drum and a line thereon, brake mechanism associated with said drum for controlling the unwinding of said line including an operating lever, flexible means operable through rotation of the drum to impart applying movement to said lever, and separate means operable through the rotation of the drum and said flexible means to limit said applying movement dependent on reduction in the unwinding movement of the drum.

3. In a control instrumentality, a reel having a cable wound thereon, braking means for the reel, control means operable through reel rotation and normally operative during a cycle to vary the braking value of the brake means on the reel in accordance with a predetermined regimen, said control means including a brake line cooperative with the brake means, and a pair of mechanisms each operatively connected with the brake line and operable through rotation of the reel, said pair of mechanisms and brake means cooperating to provide brake line activities of predetermined values per unit of time to develop the predetermined speed regimen of the reel.

4. A control instrumentality as in claim 3 characterized in that the control means includes a mechanism for relieving braking pressure values.

5. In a control instrumentality, a reel having a cable wound thereon, braking means for the reel, and control means operable through reel rotation and normally operative during a cycle to vary the braking value of the brake means on the reel in accordance with a predetermined regimen, said control means including a brake line cooperative with the brake means, a brake-line drawing mechanism responsive to reel rotation and operatively connected to the brake line for drawing the line, a brake-line releasing mechanism cooperative with such drawing mechanism to produce a definite line-drawing action of predetermined value per unit of time, said releasing mechanism including a power source for providing a substantially-constant speed, a cam control face, and a follower engaging said face carried by the mechanism and operatively connected with the brake line to thereby cooperate with the drawing mechanism in developing its definite line-drawing value.

6. A control instrumentality as in claim 5 characterized in that the line-drawing mechanism and the line-releasing mechanism each include a threaded shaft and a nut threaded thereon and advanced thereby through rotation of the respective shafts.

7. A control instrumentality as in claim 5 characterized in that the line-drawing mechanism and the line-releasing mechanism each include a threaded shaft and a nut threaded thereon and advanced thereby through rotation of the respective shafts, said follower being movably mounted on the nut of the line-releasing mechanism.

8. A control instrumentality as in claim 5 characterized in that the line-drawing mechanism and the line-releasing mechanism each include a threaded shaft and a nut threaded thereon and advanced thereby through rotation of the respective shafts, the follower being pivotally carried by the nut of the line-releasing mechanism and subject to the line-drawing activities of the nut of the line drawing mechanism.

9. A control instrumentality as in claim 5 characterized in that the control means includes a mechanism cooperative with the control face to shift the latter to vary brake pressure value.

10. A control instrumentality as in claim 5 characterized in that the line releasing mechanism includes a threaded shaft driven by the power source of the mechanism during the cycle period, said source being in the form of an inertia wheel, said shaft carrying a loose sleeve rotatively driven by and in synchronism with the reel, a member movable on said sleeve through rotation of the latter to a position of engagement with said wheel to rotate the latter and to be moved out of engagement with the wheel when the rotation speed of the wheel exceeds that of the sleeve, to thereby permit rotation of the wheel independently of the sleeve.

11. A control instrumentality as in claim 5 characterized in that the line releasing mechanism includes a threaded shaft driven by the power source of the mechanism during the cycle period, said source being in the form of an inertia wheel, said shaft carrying a loose sleeve rotatively driven by and in synchronism with the reel, a member movable on said sleeve through rotation of the latter to a position of engagement with said wheel to rotate the latter and to be moved out of engagement with the wheel when the rotation speed of the wheel exceeds that of the sleeve, to thereby permit rotation of the wheel independently of the sleeve, the time-length of the cycle being less than the time-length of rotation of the wheel to thereby provide rotative movement of the line-releasing mechanism at substantially constant speed.

12. A control instrumentality as in claim 5 wherein the line-releasing mechanism includes a threaded shaft and a nut movable thereon by shaft rotation, said shaft being axially shiftable, said shaft and the power source having complemental means providing rotative drive engagement therebetween when the shaft is in one extreme of its bodily movement, bodily shift of the shaft being operative to provide disengagement of the complemental means, said mechanism having a spring tensioned to move the shaft bodily to disengage the complemental means and in opposition to the line-drawing activities of the line-drawing mechanism, whereby the shaft will be moved into power source drive relation and held therein by drawing movements of the brake line.

13. A control instrumentality as in claim 5 including power mechanism operatively engageable with and disengageable from the reel shaft and adapted to rotate the reel in the direction opposite to that produced by cable withdrawal to thereby permit power retrieving of the cable.

14. A control instrumentality as in claim 5 including power mechanism operatively engageable with an disengageable from the reel and adapted to rotate the reel in the direction opposite that produced by cable withdrawal to thereby permit power retrieving of the cable, the line-releasing mechanism including a threaded shaft, means to drive said shaft from the power source of the mechanism, said power source being in the form of an inertia wheel, a loose sleeve on said shaft rotatively driven by and in synchronism with the reel shaft, a member movable longitudinally of the sleeve through rotation of the latter to a position of engagement with said wheel to rotate the latter and to be moved out of engagement with the wheel when the rotation speed of the wheel exceeds that of the sleeve to thereby permit rotation of the wheel independently of the sleeve during the cycle period, said wheel and said member having complemental means operative to provide the coupled relation therebetween in either direction of advance of the member on the sleeve to thereby permit wheel rotation of the shaft in the opposite directions during the cable-unwinding and cable-retrieving periods.

15. A control instrumentality as in claim 5 wherein the line-releasing mechanism includes a threaded shaft and a power source therefor adapted to be coupled and uncoupled operatively by longitudinal movements of the shaft with the uncoupled relation present in the absence of active drawing by the brake line and with the coupled relation provided by such active drawing of the line, and a slack-take-up mechanism operable by the line-drawing mechanism for taking up slack in the brake-line preliminary to and for completing the coupling of the power source and shaft of the line-releasing mechanism to thereby limit development of the brake value regimen to periods of slackless brake-line conditions.

16. A control instrumentality as in claim 3 characterized in that the brake means includes a pair of brake levers to cooperate with the reel in producing the regimen, a flexible connection for said levers, and a unit pivotally supported intermediate its ends, said unit having one end zone cooperative with the flexible connection and having its other end zone forming a support for an intermediate zone of the brake-line and subject to brake-line movements by the control means to thereby translate the controlled movements of the brake-line into synchronous movements of the flexible connection to produce the development of brake pressure on the reel at the rates determined by the control means.

17. In mechanism of the class described, a rotatable element, braking structure therefor, means operable through rotation of said element to impart applying movement to the braking structure, and apparatus operable through rotation of said element to enable and control releasing movement of said structure including a shaft, a reel, reverse cone means both on said shaft and braking structure, a flexible element trained over the cone means of the braking structure and mounted to wind on the other cone means as it unwinds from the reel, said reel being mounted to rotate and to slide, and said flexible element being terminally connected to the reel and said cone means on the shaft.

BRYAN BRASSELL.

REFERENCES CITED

The following references are of record in the file of this patent:

UNITED STATES PATENTS

| Number | Name | Date |
|---|---|---|
| 93,469 | Napier | Aug. 10, 1869 |
| 1,013,918 | Alexander | Jan. 9, 1912 |
| 1,359,993 | House | Nov. 23, 1920 |
| 2,396,071 | Anderson et al. | Mar. 5, 1946 |